(12) United States Patent
Bin Yahya et al.

(10) Patent No.: US 12,523,735 B2
(45) Date of Patent: Jan. 13, 2026

(54) LOCALIZATION DEVICE

(71) Applicant: PETROLIAM NASIONAL BERHAD (PETRONAS), Kuala Lumpur (MY)

(72) Inventors: Mazlaini Bin Yahya, Kuala Lumpur (MY); Andre Franzen, Kuala Lumpur (MY); Syed Redzal Hisham Bin Syed Abdul Hamid, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 375 days.

(21) Appl. No.: 18/016,509

(22) PCT Filed: Jul. 13, 2021

(86) PCT No.: PCT/MY2021/050059
§ 371 (c)(1),
(2) Date: Jan. 17, 2023

(87) PCT Pub. No.: WO2022/015155
PCT Pub. Date: Jan. 20, 2022

(65) Prior Publication Data
US 2023/0288522 A1    Sep. 14, 2023

(30) Foreign Application Priority Data

Jul. 16, 2020    (MY) ............... 2020003697

(51) Int. Cl.
*G01S 5/00*    (2006.01)
*G01S 5/02*    (2010.01)
*H04W 48/16*   (2009.01)

(52) U.S. Cl.
CPC ............ *G01S 5/012* (2020.05); *G01S 5/0027* (2013.01); *G01S 5/0036* (2013.01); *G01S 5/0278* (2013.01); *H04W 48/16* (2013.01)

(58) Field of Classification Search
CPC .......... G01S 5/012; G01S 5/011; G01S 5/027; G01S 5/0036; G01S 5/0278; G01S 19/34
(Continued)

(56) References Cited

U.S. PATENT DOCUMENTS

| 8,013,785 B2 * | 9/2011 | Bhattacharya | ........ G01S 5/0036 |
| | | | 342/357.31 |
| 8,639,640 B1 * | 1/2014 | Kadous | .................. G06N 20/00 |
| | | | 342/451 |

(Continued)

FOREIGN PATENT DOCUMENTS

| GB | 2573830 A | * 11/2019 | ............. G01S 19/34 |
| KR | 1020090104168 A1 | 10/2009 | |

(Continued)

OTHER PUBLICATIONS

International Search Report and Written Opinion for Corresponding Application No. PCT/MY2021/050059 (mailed Nov. 24, 2021).

*Primary Examiner* — Chuong P Nguyen
(74) *Attorney, Agent, or Firm* — Troutman Pepper Locke LLP (Rochester)

(57) ABSTRACT

A localization device comprises: a wireless communication antenna; a satellite geospatial location module configured to determine a location of the localization device from signals received from geospatial location satellites; and a controller configured to: control the wireless communication antenna to scan wireless access points in a vicinity of the localization device and determine wireless network data corresponding to identified wireless access points; use the wireless network data to determine an environment type in which the localization device is located from an indoor environment in which signals cannot be received from geospatial location satellites and an outdoor environment in which signals can be received from geospatial location satellites; generate location indication data for the localization device, the
(Continued)

location indication data depending on the environment type in which the localization device is located; control the wireless communication antenna to send the location indication data to a location database via one of the identified wireless access points; and cause the localization device to enter a sleep mode.

18 Claims, 5 Drawing Sheets

(58) Field of Classification Search
USPC .................................. 342/450, 451, 357.74
See application file for complete search history.

(56) References Cited

U.S. PATENT DOCUMENTS

| | | | | |
|---|---|---|---|---|
| 9,066,207 B2* | 6/2015 | Marti | ................... | G01S 5/02521 |
| 9,369,835 B2* | 6/2016 | Palanki | ................... | G01S 5/012 |
| 9,606,238 B2* | 3/2017 | Carter | ................... | G01S 19/485 |
| 9,642,110 B2* | 5/2017 | Liu | ........................ | H04W 4/02 |
| 9,913,220 B2* | 3/2018 | Dai | ........................ | H04W 4/30 |
| 10,168,161 B2* | 1/2019 | Park | ........................ | G01S 19/48 |
| 11,049,069 B2* | 6/2021 | Huberman | ............ | H04W 52/38 |
| 11,134,461 B2* | 9/2021 | Vyunova | ............ | H04W 64/006 |
| 2007/0133451 A1* | 6/2007 | Lee | ................... | H04W 52/0235 |
| | | | | 370/318 |
| 2008/0234930 A1 | 9/2008 | Cheok et al. | | |
| 2012/0165042 A1 | 6/2012 | Cho | | |
| 2012/0329480 A1* | 12/2012 | Hashimoto | ............ | G01S 19/34 |
| | | | | 455/456.1 |
| 2016/0259061 A1 | 9/2016 | Carter | | |
| 2023/0324499 A1* | 10/2023 | Khider | ................... | G01S 5/012 |
| | | | | 342/451 |
| 2024/0029433 A1* | 1/2024 | Lukaszewski | .......... | G06T 15/08 |

FOREIGN PATENT DOCUMENTS

| | | | | |
|---|---|---|---|---|
| KR | 100949178 B1 * | 3/2010 | ............ | G01S 19/42 |
| KR | 1020140085242 A1 | 7/2014 | | |

* cited by examiner

LOCALIZATION DEVICE

This application is a national stage application under 35 U.S.C. § 371 of International Application No. PCT/MY2021/050059, filed Jul. 13, 2021, which claims the priority benefit of Malaysia Patent Application Serial No. PI2020003697, filed Jul. 16, 2020, which are hereby incorporated by reference in their entirety.

TECHNICAL FIELD

The present disclosure relates to localization devices. In particular, the present disclosure relates to localization devices with a low power consumption for locating and tracking, for example, for use in explosive environments.

BACKGROUND

Movement tracking and tracing personnel in an explosive environment can be important situation when an undesirable event occurred in the working area. The undesirable event can be in the form of an accident from human error, natural disaster, or outbreak. The ability to quickly locate personnel in a large remote area when an undesirable event occurred can be very time critical.

Additionally, personnel equipped with a tracking device identified as entering into dangerous/unauthorized areas and warned quickly. The availability of positioning data is also useful for data analytics that provides valuable information to improve working efficiency, reduce health risk, increase security, and enhance the safety of the personnel.

Many movement tracking and tracing systems exist. However in order to be implemented in an explosive environment any equipment must meet strict requirements such as those specified in the IEC 60079-0:2017 standard.

SUMMARY

According to a first aspect of the present disclosure a localization device comprises: a wireless communication antenna; a satellite geospatial location module configured to determine a location of the localization device from signals received from geospatial location satellites; and a controller configured to: control the wireless communication antenna to scan wireless access points in a vicinity of the localization device and determine wireless network data corresponding to identified wireless access points; use the wireless network data to determine an environment type in which the localization device is located from an indoor environment in which signals cannot be received from geospatial location satellites and an outdoor environment in which signals can be received from geospatial location satellites; generate location indication data for the localization device, the location indication data depending on the environment type in which the localization device is located; control the wireless communication antenna to send the location indication data to a location database via one of the identified wireless access points; and cause the localization device to enter a sleep mode.

In an embodiment, the controller is further configured to cause the localization device to wake from the sleep mode after a sleep time period has elapsed.

In an embodiment, the sleep time period is in the range 10 seconds to 60 seconds.

In an embodiment, the controller is further configured to determine an environment type by comparing network identifiers in the wireless network data with stored network identifiers indicating an environment type associated with each respective wireless network of a plurality of wireless networks.

In an embodiment, the controller is further operable to determine a current time and date by establishing a connection with a clock server via one of the identified wireless access points.

In an embodiment, the controller or a battery management module is configured to maintain the power consumption of the device below a power consumption threshold.

In an embodiment, the power consumption threshold is less than 1.3 W.

In an embodiment, the location indication data for the localization device comprises wireless network data corresponding to identified wireless access points.

In an embodiment, the location indication data for the localization device comprises a location of the localization device determined from signals received from geospatial location satellites.

The low-power circuitry design enables the device to function with a dimension acceptable, convenient, and practical for the user to carry and operate it with high safety when working in an explosive environment. The low-power consumption also enables the device to have long lasting battery operation. It is achieved using a low-power processor and software program that enables the device to actively operate in an adjustable specific interval and otherwise operate in a sleep mode.

Embodiments of the invention use a modified Wi-fi solution through software configuration and unique algorithm implementation that enables low-power and short packet transmission to the receiver end enabling long-range communication. The low-power consumption is achieved using both physical hardware and software implementation. The hardware uses a low-power processor and a geospatial positioning module to enable it as a motion tracking and tracing device without the requirement for a special containment. The software in the localization device uses an algorithm that keeps the power consumption to be low at all times and controls the power transmission when the device is sending data to the receiver and the processing server. The low-power transmission allows the device to operate with an intrinsically safe profile in an explosive environment. It also meets the criteria to operate safely under the standard guidelines for explosive environmental operation. The low-power consumption also provides the device with a long lasting battery operation. The low-power characteristics of the device with combined with the small form-factor dimension results in a practical mobility use in an explosive environment.

The positioning and other intrinsic device data is sent to the receiver end and continues the transmission over the internet until it reaches the processing server for further data analytic. The server processes the data for a readable interpretation of the positioning data based on the predictive method for the current position and movement of the device. The tracing of the device is achieved by using historical movement data. The server also processes the data from other devices as well as mobile phones and provides a readable interpretation of the position and movement According to a second aspect of the present disclosure method of controlling a localization device is provided. The method comprises: controlling a wireless communication antenna of the localization device to scan wireless access points in a vicinity of the localization device and determine wireless network data corresponding to identified wireless access points; using the wireless network data to determine an environment type in which the localization device is located from an indoor environment in which signals cannot be received from geospatial location satellites and an outdoor environment in which signals can be received from geospatial location satellites; generating location indication data for the localization device, the location indication data depending on the environment type in which the localization device is located; controlling the wireless communication antenna to send the location indication data to a location database via one of the identified wireless access points; and causing the localization device to enter a sleep mode.

In an embodiment, the method further comprises causing the localization device to wake from the sleep mode after a sleep time period has elapsed.

In an embodiment the sleep time period is in the range 10 seconds to 60 seconds.

In an embodiment using the wireless network data to determine an environment type in which the localization device is located comprises comparing network identifiers in the wireless network data with stored network identifiers indicating an environment type associated with each respective wireless network of a plurality of wireless networks.

In an embodiment, the method further comprises determining a current time and date by establishing a connection with a clock server via one of the identified wireless access points.

In an embodiment, the method further comprises maintaining a power consumption of the localization device below a power consumption threshold.

In an embodiment, the power consumption threshold is less than 1.3 W.

In an embodiment, the location indication data for the localization device comprises wireless network data corresponding to identified wireless access points.

In an embodiment, the location indication data for the localization device comprises a location of the localization device determined from signals received from geospatial location satellites.

Further embodiments of the present invention are set out in the following clauses:

1. A localization device comprising:
    a wireless communication antenna;
    a satellite geospatial location module configured to determine a location of the localization device from signals received from geospatial location satellites; and
    a controller configured to:
      control the wireless communication antenna to scan wireless access points in a vicinity of the localization device and determine wireless network data corresponding to identified wireless access points;
      use the wireless network data to determine an environment type in which the localization device is located from an indoor environment in which signals cannot be received from geospatial location satellites and an outdoor environment in which signals can be received from geospatial location satellites;
      generate location indication data for the localization device, the location indication data depending on the environment type in which the localization device is located;
      control the wireless communication antenna to send the location indication data to a location database via one of the identified wireless access points; and
      cause the localization device to enter a sleep mode.
2. A localization device according to clause 1, wherein the controller is further configured to cause the localization device to wake from the sleep mode after a sleep time period has elapsed.
3. A localization device according to clause 2, wherein the sleep time period is in the range 10 seconds to 60 seconds.
4. A localization device according to any preceding clauses, wherein the controller is further configured to determine an environment type by comparing network identifiers in the wireless network data with stored network identifiers indicating an environment type associated with each respective wireless network of a plurality of wireless networks.
5. A localization device according to any preceding clauses, wherein the controller is further operable to determine a current time and date by establishing a connection with a clock server via one of the identified wireless access points.
6. A localization device according to any preceding clause wherein the controller or a battery management module is configured to maintain the power consumption of the device below a power consumption threshold.
7. A localization device according to clause 6, wherein the power consumption threshold is less than 1.3 W.
8. A localization device according to any preceding clause, wherein the location indication data for the localization device comprises wireless network data corresponding to identified wireless access points.
9. A localization device according to any one of clauses 1 to 7, wherein the location indication data for the localization device comprises a location of the localization device determined from signals received from geospatial location satellites.
10. A method of controlling a localization device, the method comprising:
    controlling a wireless communication antenna of the localization device to scan wireless access points in a vicinity of the localization device and determine wireless network data corresponding to identified wireless access points;
    using the wireless network data to determine an environment type in which the localization device is located from an indoor environment in which signals cannot be received from geospatial location satellites and an outdoor environment in which signals can be received from geospatial location satellites;
    generating location indication data for the localization device, the location indication data depending on the environment type in which the localization device is located;
    controlling the wireless communication antenna to send the location indication data to a location database via one of the identified wireless access points; and
    causing the localization device to enter a sleep mode.
11. A method according to clause 10 further comprising causing the localization device to wake from the sleep mode after a sleep time period has elapsed.
12. A method according to clause 11, wherein the sleep time period is in the range 10 seconds to 60 seconds.
13. A method according to any one of clauses 10 to 12, wherein using the wireless network data to determine an environment type in which the localization device is located comprises comparing network identifiers in the wireless network data with stored network identifiers indicating an environment type associated with each respective wireless network of a plurality of wireless networks.

14. A method according to any one of clauses 10 to 13, further comprising determining a current time and date by establishing a connection with a clock server via one of the identified wireless access points.
15. A method according to any one of clauses 10 to 14, further comprising maintaining a power consumption of the localization device below a power consumption threshold.
16. A method according to clause 15, wherein the power consumption threshold is less than 1.3 W.
17. A method according to any one of clauses 10 to 16, wherein the location indication data for the localization device comprises wireless network data corresponding to identified wireless access points.
18. A method according to any one of clauses 10 to 16, wherein the location indication data for the localization device comprises a location of the localization device determined from signals received from geospatial location satellites.

BRIEF DESCRIPTION OF THE DRAWINGS

In the following, embodiments of the present invention will be described as non-limiting examples with reference to the accompanying drawings in which.

DETAILED DESCRIPTION

The present disclosure relates to a localization device for the localization of personnel in an environment. In hazardous environments such as oil platforms and oil refinery where explosive substances are potentially present, there are limits on the power consumption and power of radio frequency transmission by locating devices.

Figure 1:
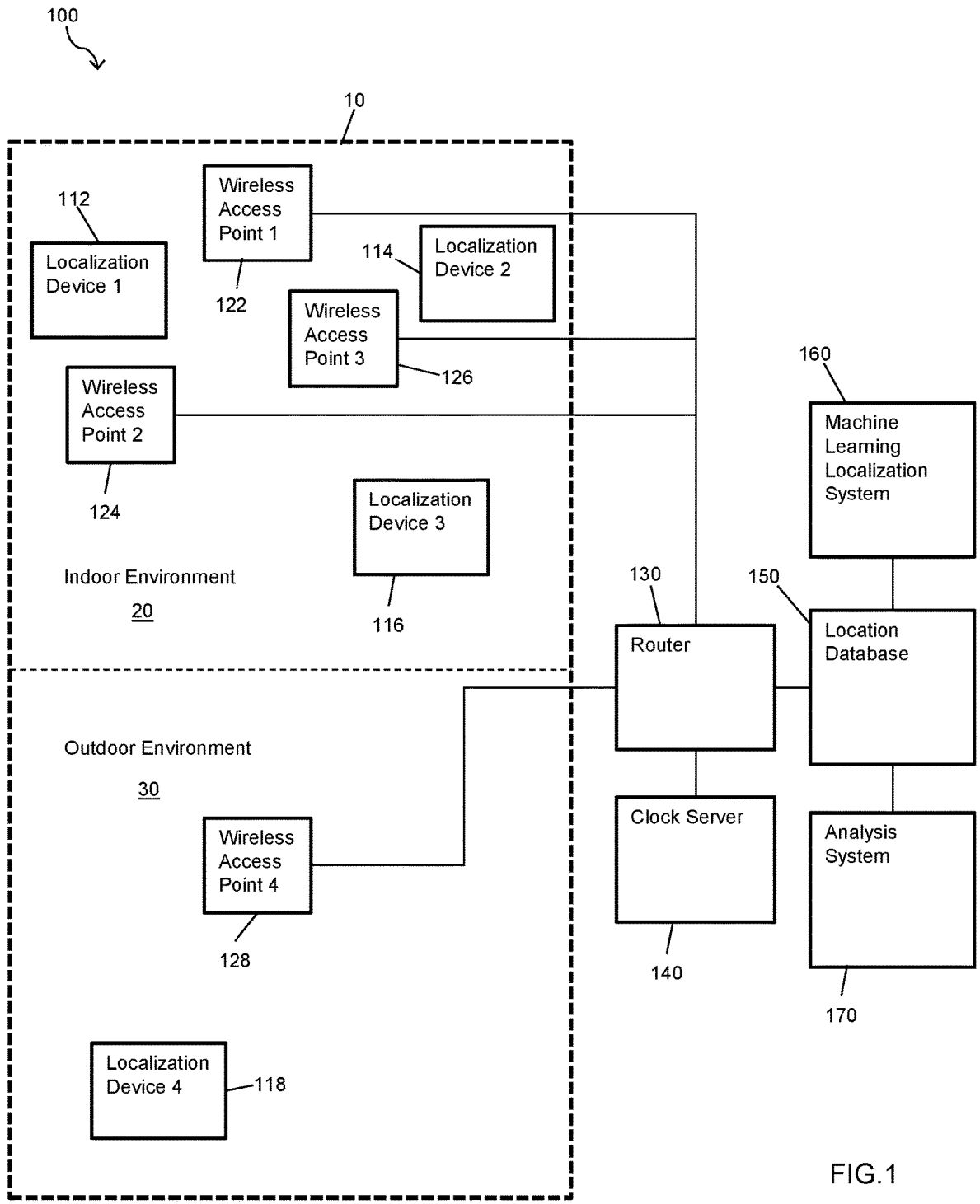
FIG. 1 is a block diagram a system for estimating locations of localization devices in an environment according to an embodiment of the present invention.

FIG. 1 is a block diagram a system for estimating locations of localization devices in an environment according to an embodiment of the present invention. As shown in FIG. 1, the system 100 is configured to locate personnel in an environment 10. The environment 10 comprises an indoor environment 20 and an outdoor environment 30. In the present disclosure, an indoor environment refers to an environment in which signals from a satellite geospatial geolocation system cannot be received and an outdoor environment refers to an environment in which signals from a satellite geospatial geolocation system can be received. Examples of satellite geospatial geolocation systems include the global positioning system (GPS), the Global Navigation Satellite System (GLONASS) and the BeiDou Navigation Satellite System (BDS). The environment 10 may be, for example, an oil platform, an oil refinery, a chemical processing plant or other type of explosive environment.

A plurality of localization devices are arranged within the environment 10. As shown in FIG. 1, a first localization device 112, a second localization device 114 and a third localization device 116 are within the indoor environment. A fourth localization device 118 is within the outdoor environment. The localization devices may be attached to personnel working in the environment 10 and the purpose of the localization devices is to allow the locations of the personnel to be tracked. The localization devices may also be attached to assets such as movable equipment to allow the movement of the assets to be tracked.

As shown in FIG. 1, A plurality of wireless access points are arranged within the environment 10. A first wireless access point 122, a second wireless access point 124, and a third wireless access point 126 are arranged within the indoor environment 20. A fourth wireless access point 128 is arranged within the outdoor environment.

The plurality of wireless access points are connected to a router 130. A clock server 140 is also connected to the router 130. The clock server 140 provides time and date information and may be synchronized to a network time protocol (NTP) server are regular intervals such as once a day.

The system 100 further comprises a location database 150 which stores location is information for the localization devices at different times to allow tracking of the localization devices. A machine learning localization system 160 is connected to the location database 150. The machine learning localization system 160 stores a machine learning model which allows locations of the localization devices in the indoor environment to be estimated from signals received by the localization devices from the wireless access points. An analysis system 170 is also connected to the location database 150. The analysis system 170 allows analysis and visualization of the location data stored in the location database 150 to be performed. For example, the analysis system 170 may provide for real-time monitoring of personnel locations, productivity analysis of the personnel, for example by determining the time taken to complete a task, and tracking and contact tracing of personnel.

Figures 2, 3:
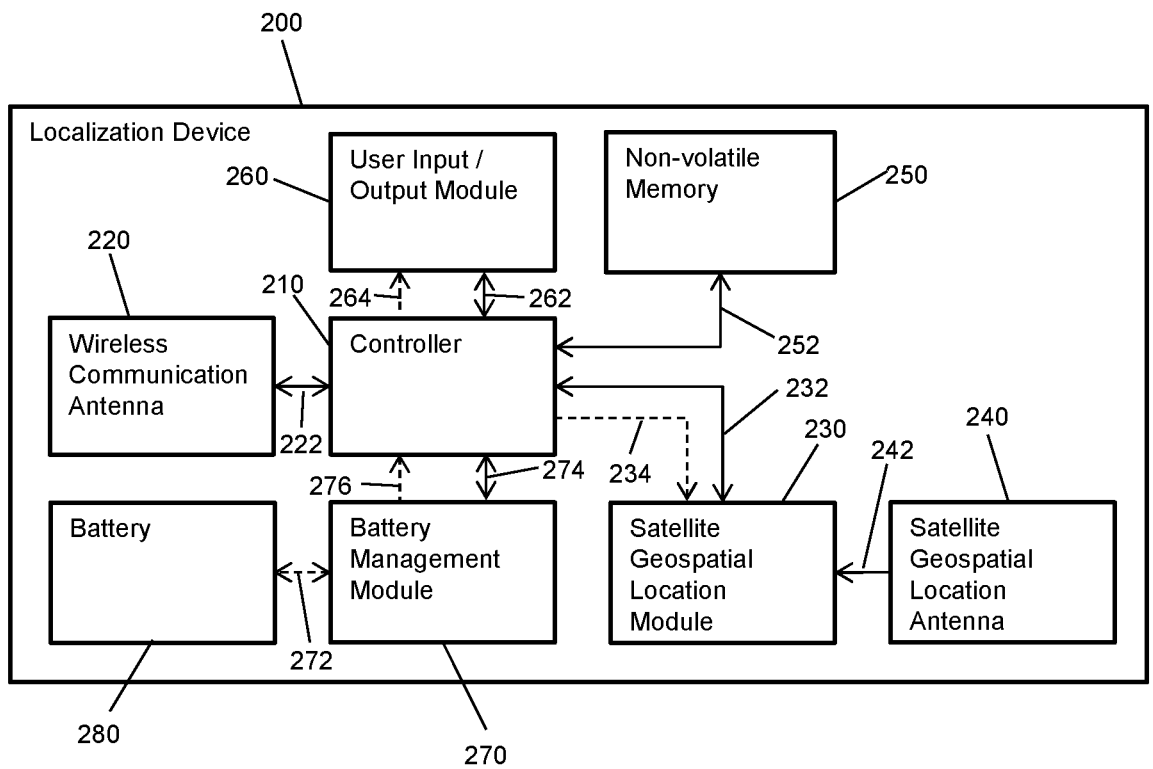
FIG. 2 is a block diagram showing a localization device according to an embodiment of the present invention.
FIG. 3 is a table showing network data stored in a non-volatile memory of a localization device according to an embodiment of the present invention.

FIG. 2 is a block diagram showing a localization device according to an embodiment of the present invention. The localization device 200 shown in FIG. 2 corresponds to the first localization device 112, the second localization device 114, the third localization device 116 or the fourth localization device 118 shown in FIG. 1. As shown in FIG. 2, localization device 200 comprises a controller 210, a wireless communication antenna 220, a satellite geospatial location module 230, a satellite geospatial location antenna 240, a non-volatile memory 250, a user input/output module 260, a battery management module 270 and a battery 280. The controller 210 may be implemented as a microcontroller unit (MCU). The wireless communication antenna 220 may be, for example, a WiFi antenna which allows wireless communication with wireless access points. The wireless communication antenna 220 is coupled to the controller 210 and receives and sends signals 222 to the controller 210. The satellite geospatial location module 230 is configured to process satellite geospatial location signals received by the satellite geospatial location antenna 240 and determine the location of the localization device 200. The satellite geospatial location module 230 receives and sends data signals to the controller 230 and receives data signals 242 from the satellite geospatial location antenna 240. The controller 210 controls the supply of power 234 to the satellite geospatial location module 230. The non-volatile memory 250 stores data including network data which is described below with reference to FIG. 3. As shown in FIG. 2, the controller 250 sends and receives data 252 to and from the non-volatile memory 250. The user input/output module 260 is an interface which allows a user to input information and for information to be presented to a user. The user input/output module 260 may be implemented as any type of user interface such as a touchscreen or a display and keypad. As shown in FIG. 2, the controller 210 supplies power 264 to the user input/output module 260 and also sends and receives data 262 to and from the user input/output module 260. The battery management module 270 supplies power 276 to the controller 210 and sends and receives data signals 274 to and from the controller 210. These data signals 274 may be indications of remaining battery power stored by the battery 280 and control signals to control the operation of the battery 280. As shown in FIG. 2, the battery 280 supplies power 272 to the battery management module 270 and may also receive power 272 from the battery management module 270, for example when the battery 280 is being charged.

The controller 210 or the battery management module 270 may be configured to maintain the power consumption of the localization device 200 below a threshold. The threshold may be set at 1.3 W which corresponds to the maximum power specified in the IEC 60079-0:2017 standard. Alternatively the threshold may be set at a lower value such as 1 W or 0.5 W.

FIG. 3 is a table showing network data stored in a non-volatile memory of a localization device according to an embodiment of the present invention. The network data 300 shown in FIG. 3 is an example of the data stored in the non-volatile memory 250 of the localization device 200 shown in FIG. 2.

As shown in FIG. 3, the network data comprises a set of data entries for each of a plurality of networks. The data entries comprise a network name 310, a password 320 and an indication an environment type 330. The network name indicates the name of the respective network, such as the service set identifier (SSID). In the example shown in FIG. 3 the network data 300 corresponds to the configuration shown in FIG. 1. Thus, the network AP1_SSID corresponds to the first wireless access point 122, the network AP2_SSID corresponds to the second wireless access point 124, the network AP3_SSID corresponds to the third wireless access point 126 and the network AP4_SSID corresponds to the fourth wireless access point 128. The environment type 330 indication indicates whether the network corresponds to an indoor environment or an outdoor environment. This environment type 330 along with the network password 320 may be manually added during set up of the localization system 100 shown in FIG. 1.

Figure 4:
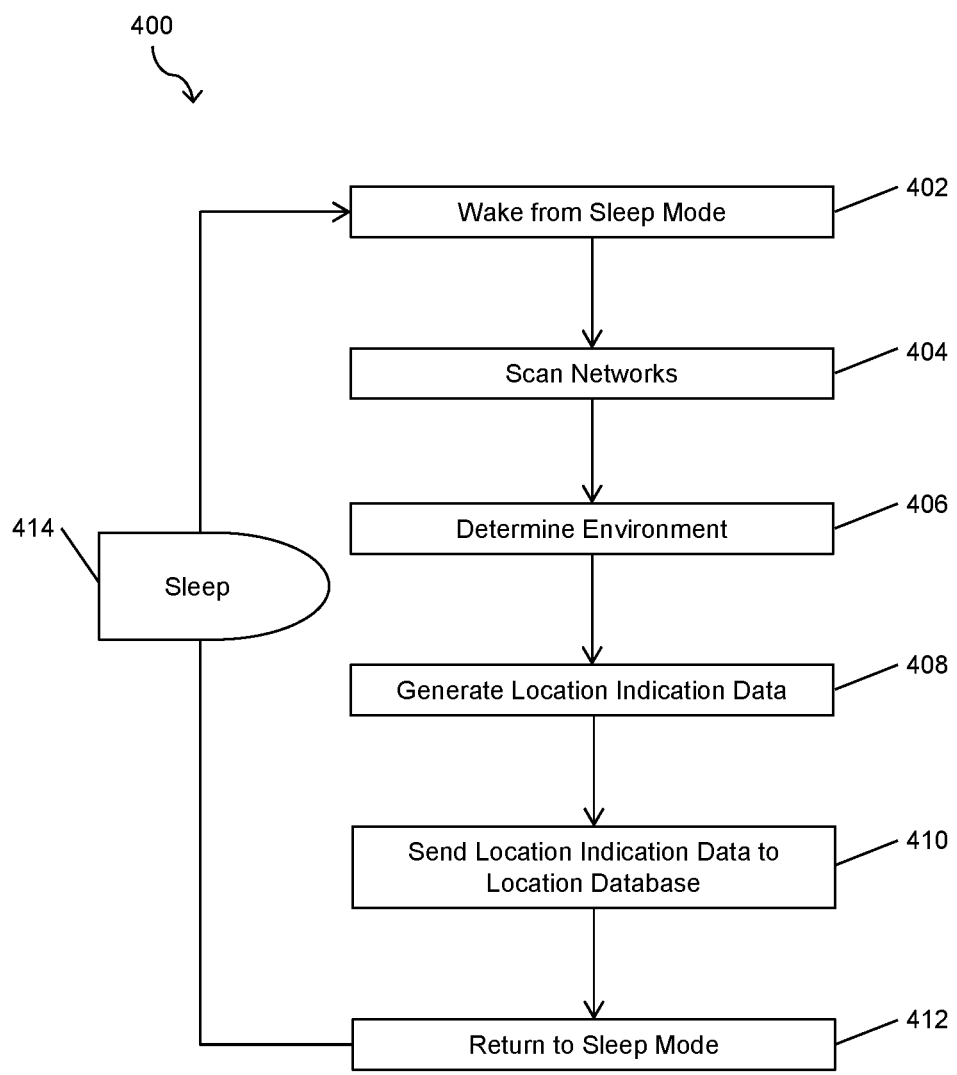
FIG. 4 is a flowchart showing a method of generating location indication data in a localization device according to an embodiment of the present invention.

FIG. 4 is a flowchart showing a method of generating location indication data in a localization device according to an embodiment of the present invention. The method 400 shown in FIG. 4 is carried out by the controller 210 of the localization device 200 shown in FIG. 2.

In step 402, the controller 210 wakes the localization device 200 from a sleep mode. As will be described in more detail below, the localization device 200 is configured to send location indication information to the location database 150 and then enter a sleep mode for a sleep time period. This sleep time period may be set as, for example a period between 10 seconds and 60 seconds. The controller 210 may implement a timer to determine when this sleep time period has expired and wake the localization device 200 in response to determining that the sleep time period has expired. In step 402, the controller 210 controls the battery management module 270 to supply power from the battery 280 to the various modules of the localization device 200.

In step 404, the controller 210 controls the wireless communication antenna 220 to perform a scan of all network access points in the vicinity of the localization device 200 and for each network access point, determines network data and stores this network data in a network data list. The network data list comprises indications of network identifiers such as service set identifiers (SSIDs), indications of device identifiers such as media access control addresses (MAC addresses) of the access points and signal strength indicators such as received signal strength indicators (RSSIs).

In step 406, the controller 210 determines the environment in which the localization device 200 is located. The controller 210 compares the network data in the network data list determined in step 404 with the network data stored in the non-volatile memory 250. As shown in FIG. 3, the network data 300 stored in the non-volatile memory 250 comprises an indication of the environment type 330 for each network name 310. Thus, by comparing the network data in the network data list with the network data stored in the non-volatile memory 250, the controller 210 identifies the environment type associated with the network access points in the vicinity of the localization device 200. If the network data list includes networks of both the indoor environment type and the outdoor environment type, the controller 210 may use the signal strength indicators to determine a closest network, that is the network having the strongest received signal strength indicator, and determine the environment type from as the environment type of the closest network.

In step 408, the controller 210 generates location indication data. The process of generation of the location indication data and the nature of the location indication data depends on the environment type. The respective processes for generating location indication data in an indoor environment and in an outdoor environment are described below with reference to FIG. 5 and FIG. 6 respectively. The location indication data may comprise indications of access points and indications of the signals received from those access points, alternatively, or additionally, the location indication data may comprise geolocation data, such as a latitude, a longitude and an elevation determined by the satellite geospatial location module 230.

In step 410, the controller 410 generates signals to control the wireless communication antenna 220 so send the location indication data to the location database 150. This process may involve the controller 210 using the network data 300 stored in the non-volatile memory 250 to connect to the access point corresponding to the closest network and to send the location indication data to the location database 150 via the closest network.

In step 412, after sending the location indication data to the location database 150, the controller 210 causes the localization device 200 to enter the sleep 414 mode. This causes the battery management module 270 to reduce the power supplied to the localization device to a minimal level. The sleep 414 mode may last for a time of, for example between 10 seconds and 60 seconds. Once the sleep 414 time has passed, the method 400 returns to step 402.

Figure 5:
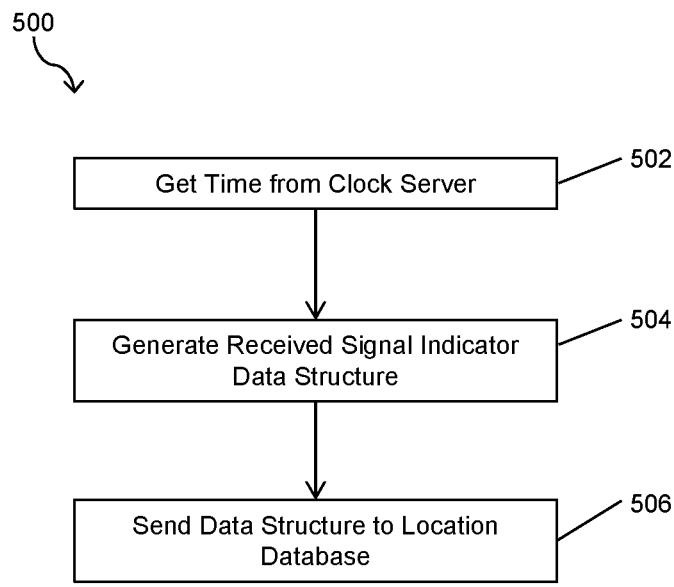
FIG. 5 is a flowchart showing a method of generating location indication data in an indoor environment in a localization device according to an embodiment of the present invention.

FIG. 5 is a flowchart showing a method of generating location indication data in an indoor environment in a localization device according to an embodiment of the present invention. The method 500 shown in FIG. 5 corresponds to the processing carried out in step 408 shown in FIG. 4 when the localization device is determined in step 406 to be in an indoor environment.

In step 502, the controller 210 controls the wireless communication antenna 220 to determine the current time and date from the clock server 140. Step 502 may be preceded by establishing a network connection with the closest wireless access point to allow the localization device 200 to communicate with the clock server 140.

In step 504, the controller 210 generates a received signal indicator data structure. The received signal indicator data structure is generated using the network data list. The received signal indicator data structure may be generated in the JavaScript Object Notation (JSON) format and may comprise an indication of the device identifier of the localization device 200, an indication of the current time and date, and a set of JSON substructures indicating, for each detected access point, the network identifier, the access point identifier and a received signal strength indication. The received signal indication data structure may also include additional information relating to the localization device 200 such as the battery power level, and the operating mode.

In step 506, the controller 210 controls the wireless communication antenna 220 to send the received signal indicator data structure to the location database 150, this corresponds to step 410 shown in FIG. 4 and the method then continues to step 412 shown in FIG. 4.

Figure 6:
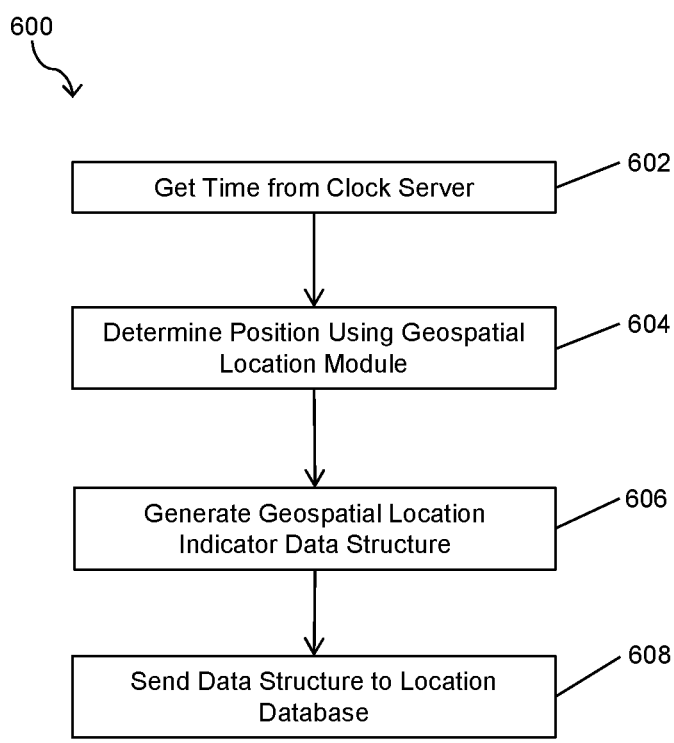
FIG. 6 is a flowchart showing a method of generating location indication data in an outdoor environment in a localization device according to an embodiment of the present invention.

FIG. 6 is a flowchart showing a method of generating location indication data in an outdoor environment in a localization device according to an embodiment of the present invention. The method 600 shown in FIG. 6 corresponds to the processing carried out in step 408 shown in FIG. 4 when the localization device is determined in step 406 to be in an outdoor environment.

In step 602, the controller 210 controls the wireless communication antenna 220 to determine the current time and date from the clock server 140. Step 602 may be preceded by establishing a network connection with the closest wireless access point to allow the localization device 200 to communicate with the clock server 140.

In step 604, satellite geospatial location module 230 receives signals from the satellite geospatial location antenna 240 which in turn receives signals transmitted by geospatial location satellites. The satellite geospatial location module 230 uses the received signals to determine the geospatial location of the localization device 200. The geospatial location of the localization device 200 may comprise an indication of latitude and longitude. The geospatial location of the localization device 200 may further comprise an indication of elevation.

In step 606, the controller 210 generates a geospatial location indicator data structure. The geospatial location indicator data structure may be generated in the JavaScript Object Notation (JSON) format and may comprise an indication of the device identifier of the localization device 200, an indication of the current time and date, and an indication of the geospatial location of the localization device. The geospatial location indicator data structure may also include additional information relating to the localization device 200 such as the battery power level, and the operating mode.

In step 608, the controller 210 controls the wireless communication antenna 220 to send the geospatial location indicator data structure to the location database 150, this corresponds to step 410 shown in FIG. 4 and the method then continues to step 412 shown in FIG. 4.

As described above, the localization device 200 sends location indication data to the location database 150. Men the localization device 200 is determined to be in an indoor location the location indication data comprises indications of access points and indications of the received signals from the access points. The machine learning localization system 160 uses this data to estimate the location of the localization device 200 in the indoor environment 20. The machine learning localization system 200 stores a trained machine learning model which takes the indications of access points and indication of received signals from the access points as inputs and outputs an estimated location for the localization device. This estimated location is stored the location database along with the corresponding time and date. The machine learning model may be trained as follows. A localization device is configured in a training mode. The location device in the training mode is then moved to a plurality of set locations in the indoor environment. At each location, the received signals from the access points are determined and this information is provided to the machine learning localization system 160. The machine learning localization system 160 then uses the indications of the received signals for each location to train the machine learning model. Once trained, this model outputs an indication of location of the localization device in response to an input of the indications of access points and indication of received signals from the access points. The machine learning model may utilize an algorithm that is capable of producing probabilities such as ensemble algorithms (random forests, bagging, boosting algorithms like adaboost or xgboost, stacking algorithms, etc.).

The analysis system 170 allows analysis of the location data stored in the location database to be carried out. This analysis be used for contact tracing if a personnel member is found to have contracted a contagious disease. Since the locations and times when the user was present at those locations can be determined from the stored data, other members of personnel who came into close contact with the personnel member can be identified from the tracking data and those personnel can be isolated and tested for the disease.

As described above, the present disclosure provides a localization device which has a relatively low power consumption in order to comply with standards for operating in an explosive environment.

The IEC 60079-0:2017 standard specifies the general requirements for construction, testing and marking of Ex Equipment and Ex Components intended for use in explosive atmospheres. The table below shows certain clauses of the standard and these are compared with an embodiment of the present invention.

| IEC60079-0 Compliance | Compliance Value | Embodiment |
| --- | --- | --- |
| Thermal ignition compliance (Clause 5.6.1) | Maximum 1.3 W | Maximum 0.5 W<br>Low power mode: 0.05 W (sleep mode) |
| Temperature for small components (Clause 5.6.2): surface area <20 mm$^2$ | Maximum 275° C. | Maximum 45° C. |
| Maximum power dissipation ambient temperature for components less than 20 mm$^2$ at ambient temperature 50° C. (Clause 5.6.2) | Maximum 1.25 W | Maximum: 0.1 W |
| Current permissible over wiring within apparatus (Clause 5.6.3): Diameter 0.2 mm at ambient temperature 40° C. | Maximum: 3.0 A | Maximum: 0.2 A |
| Maximum current permissible over tracks on printed circuit boards (Clause 5.6.4) at ambient temperature 40° C. with minimum width 0.3 mm and 0.5 mm | 0.3 mm: 0.444 A<br>0.5 mm: 0.648 A | 0.3 mm: 0.15 A<br>0.5 mm: 0.18 A |
| Radio frequency received in hazardous areas (Clause 6.7.2) | Maximum Group IIC: 2 W | Maximum: 0.36 W |

As shown in the table above, embodiments of the present invention allow the provision of a localization device which complies with the IEC 60079-0:2017 standard.

The power consumption of the localization device depends on the sleeping time—that is the length of the sleep mode.

Figure 7:
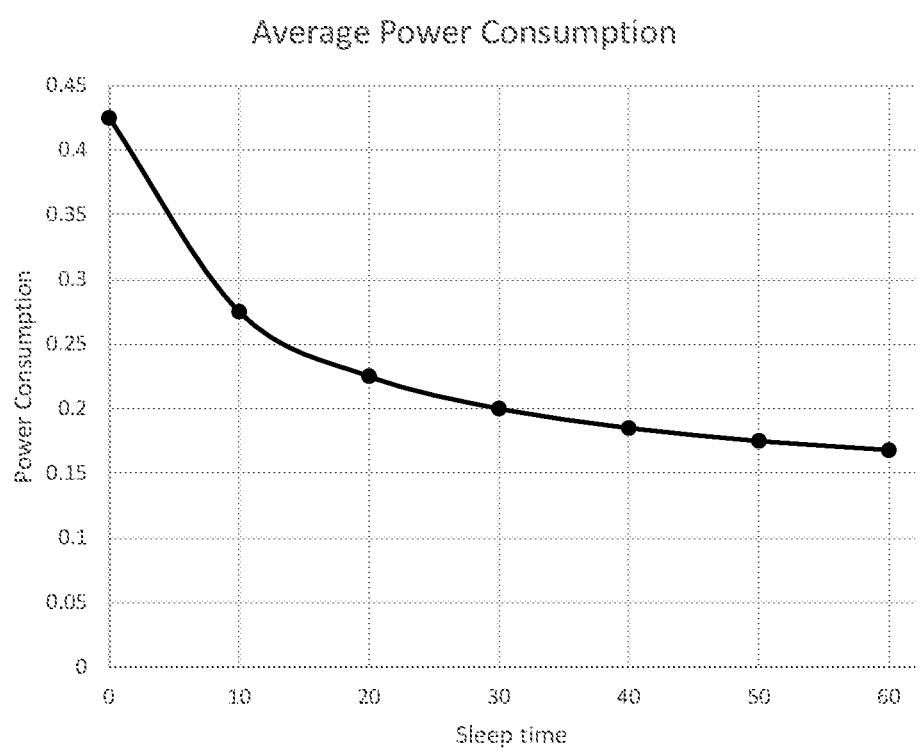
FIG. 7 is a graph showing the dependence of average power consumption on sleep time for a localization device according to an embodiment of the present invention.

FIG. 7 is a graph showing the dependence of average power consumption on sleep time for a localization device according to an embodiment of the present invention.

Example calculations to give the graph are as follows.

Typically, the measurement time is between 6 seconds and 10 seconds in an outdoor environment and between 8 seconds and 11 seconds in an indoor environment. The current is between 70-100 mA. Therefore the power consumption in active mode (Pa) is approximately:

$Pa = 85\ mA \times 5V = 0.425\ W$

During the sleep mode, the current is approximately 20 mA. Therefore the power consumption in sleep mode (Ps) is approximately:

$Ps = 20\ mA \times 5V = 0.1\ W$

Therefore, for a 10 second sleep mode, the average power consumption is:

$(10 \times Pa + 10 \times Ps)/(10+10) = 0.275\ W.$

For a 30 second sleep mode, the average power consumption is:

$(10 \times Pa + 30 \times Ps)/(10+30) = 0.2\ W.$

For a 60 second sleep mode, the average power consumption is:

$(10 \times Pa + 60 \times Ps)/(10+60) = 0.17\ W$

Whilst the foregoing description has described exemplary embodiments, it will be understood by those skilled in the art that many variations of the embodiments can be made within the scope and spirit of the present invention.

The invention claimed is:

1. A localization device comprising:
   a wireless communication antenna;
   a satellite geospatial location module configured to determine a location of the localization device from signals received from geospatial location satellites; and
   a controller configured to:
   control the wireless communication antenna to scan wireless access points in a vicinity of the localization device and determine wireless network data corresponding to identified wireless access points;
   use the wireless network data to determine an environment type in which the localization device is located from an indoor environment in which signals cannot be received from geospatial location satellites and an outdoor environment in which signals can be received from geospatial location satellites;
   generate location indication data for the localization device, the location indication data comprising a data structure depending on whether the environment type in which the localization device is located is the indoor environment in which signals cannot be received from geospatial location satellites or the outdoor environment in which signals can be received from geospatial location satellites, wherein the data structure comprises a received signal indicator data structure if the environment type is the indoor environment or a geospatial location indicator data structure if the environment type is the outdoor environment;
   control the wireless communication antenna to send the location indication data to a location database via one of the identified wireless access points; and
   cause the localization device to enter a sleep mode after sending the location data to the location database.

2. The localization device according to claim 1, wherein the controller is further configured to cause the localization device to wake from the sleep mode after a sleep time period has elapsed.

3. The localization device according to claim 2, wherein the sleep time period is in g range of 10 seconds to 60 seconds.

4. The localization device according to claim 1, wherein the controller is further configured to determine the environment type by comparing network identifiers in the wireless network data with stored network identifiers indicating another environment type associated with each respective wireless network of a plurality of wireless networks.

5. The localization device according to claim 1, wherein the controller is further operable to determine a current time and date by establishing a connection with a clock server via one of the identified wireless access points.

6. The localization device according to claim 1, wherein the controller or a battery management module is configured to maintain g power consumption of the device below a power consumption threshold.

7. The localization device according to claim 6, wherein the power consumption threshold is less than 1.3 W.

8. The localization device according to claim 1, wherein the location indication data for the localization device comprises the wireless network data corresponding to the identified wireless access points.

9. The localization device according to claim 1, wherein the location indication data for the localization device comprises a location of the localization device determined from signals received from geospatial location satellites.

10. A method of controlling a localization device, the method comprising:
   controlling a wireless communication antenna of the localization device to scan wireless access points in a vicinity of the localization device and determine wireless network data corresponding to identified wireless access points;
   using the wireless network data to determine an environment type in which the localization device is located from an indoor environment in which signals cannot be received from geospatial location satellites and an outdoor environment in which signals can be received from geospatial location satellites;
   generating location indication data for the localization device, the location indication data comprising a data structure depending on whether the environment type in which the localization device is located is the indoor environment in which signals cannot be received from geospatial location satellites or the outdoor environment in which signals can be received from geospatial location satellites, wherein the data structure comprises a received signal indicator data structure if the environment type is the indoor environment or a geospatial location indicator data structure if the environment type is the outdoor environment;
   controlling the wireless communication antenna to send the location indication data to a location database via one of the identified wireless access points; and
   causing the localization device to enter a sleep mode after sending the location data to the location database.

11. The method according to claim 10 further comprising causing the localization device to wake from the sleep mode after a sleep time period has elapsed.

12. The method according to claim 11, wherein the sleep time period is in a range of 10 seconds to 60 seconds.

13. The method according to claim 10, wherein using the wireless network data to determine the environment type in which the localization device is located comprises comparing network identifiers in the wireless network data with stored network identifiers indicating another environment type associated with each respective wireless network of a plurality of wireless networks.

14. The method according to claim 10, further comprising determining a current time and date by establishing a connection with a clock server via one of the identified wireless access points.

15. The method according to claim 10, further comprising maintaining a power consumption of the localization device below a power consumption threshold.

16. The method according to claim 15, wherein the power consumption threshold is less than 1.3 W.

17. The method according to claim 10, wherein the location indication data for the localization device comprises the wireless network data corresponding to the identified wireless access points.

18. The method according to claim 10, wherein the location indication data for the localization device comprises a location of the localization device determined from signals received from geospatial location satellites.

* * * * *